INVENTOR.
CONSTANT V. DAVID
BY Knox & Knox

April 4, 1961  C. V. DAVID  2,978,205
TIP-JET DRIVEN DUCTED FAN FOR AIRCRAFT
Filed Sept. 29, 1958  3 Sheets-Sheet 2

INVENTOR.
CONSTANT V. DAVID
BY *Knox & Knox*

INVENTOR.
CONSTANT V. DAVID
BY
Knox & Knox

United States Patent Office 2,978,205
Patented Apr. 4, 1961

2,978,205

TIP-JET DRIVEN DUCTED FAN FOR AIRCRAFT

Constant V. David, San Diego, Calif., assignor to Ryan Aeronautical Co., San Diego, Calif.

Filed Sept. 29, 1958, Ser. No. 764,068

1 Claim. (Cl. 244—23)

The present invention relates generally to aircraft propulsion and more particularly to a tip-jet driven ducted fan for use in aircraft.

The primary object of this invention is to provide a ducted fan for use primarily as a vertical thrust impeller to enable an aircraft to lift vertically before transition to horizontal flight, the fan being driven by the exhaust gases from the aircraft's main propulsion jet engine ejected through jet units on the tips of the individual fan blades.

Another object of this invention is to provide a ducted fan having a fuel system to eject pyrophoric fuel into the tip-jet units for increased thrust when required.

Still another object of this invention is to provide a ducted fan in which the tip-jet units are efficiently cooled to prevent burning of the units themselves and to cool the jet efflux to avoid burning the duct structure.

A further object of this invention is to provide a ducted fan which is sufficiently compact to be installed in an aircraft wing of substantially normal thickness.

Finally, it is an object to provide a ducted fan of the aforementioned character which is simple to construct and which will greatly add to the performance and versatility of the aircraft.

With these and other objects definitely in view, this invention consists in the novel construction, combination and arrangement of elements and portions, as will be hereinafter fully described in the specification, particularly pointed out in the claim, and illustrated in the drawings which form a material part of this disclosure, and in which:

Similar characters of reference indicate similar or identical elements and portions throughout the specification and throughout the views of the drawings.

Figure 1:
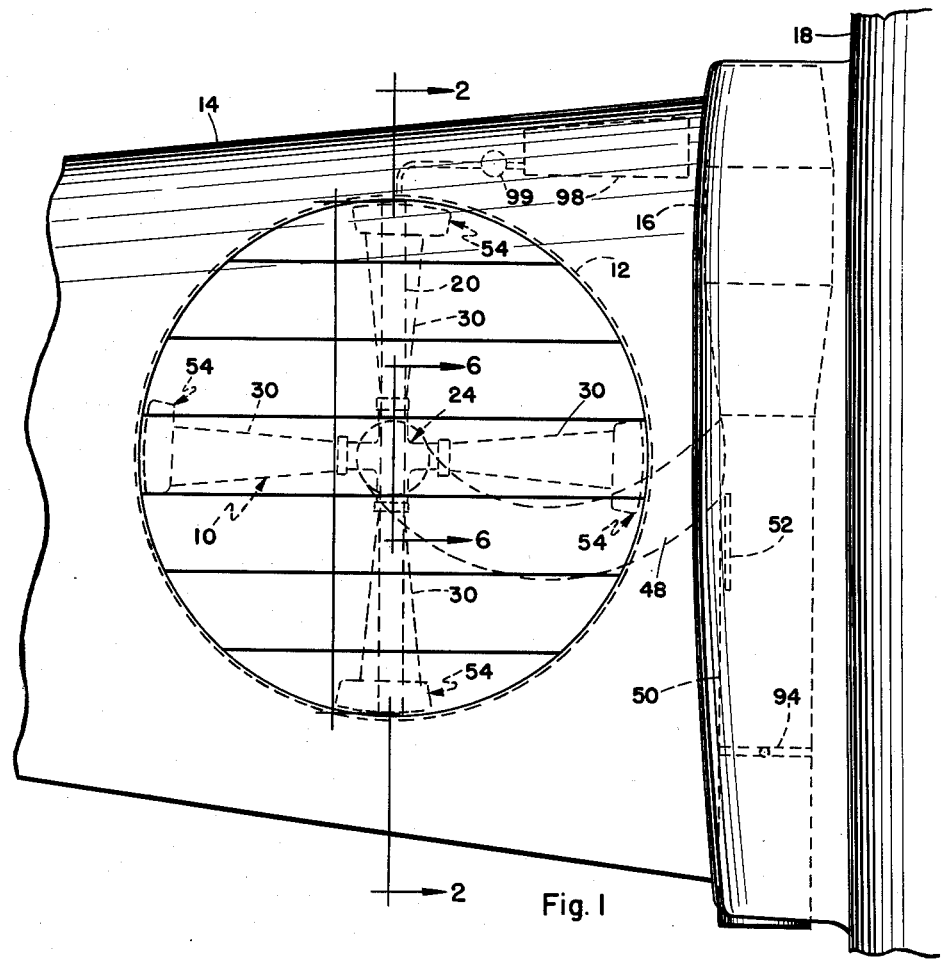
Figure 1 is a fragmentary top plan view of an aircraft wing and engine installation showing the arrangement of the ducted fan.

Referring now to Figures 1-7 of the drawings, the fan 10 is installed in a circular duct 12 extending vertically through the wing 14 of an aircraft, the aircraft being propelled in forward flight by a conventional jet engine 16, or multiple jet engines. In the configuration illustrated, the jet engine 16 is located adjacent the fuselage 18, the duct 12 being positioned close to said engine in the root end of wing 14, as in Figure 1. In other types of aircraft the arrangement may be difficult, but the ducted fan installation is preferably located close to the jet engine or engines to simplify ducting and control connections.

Extending diametrically across the duct 12, generally parallel to the longitudinal axis of the aircraft, are an upper beam 20 and a lower beam 22 which support the entire fan structure and are designed accordingly to suit the wing structure. The fan 10 comprises a central hub 24 having a lower sleeve portion 26 which flares upwardly and outwardly into a plurality of radially extending, tubular stub arms 28, on which the fan blades 30 are mounted, each blade being provided with pitch adjusting mechanism if desired, although such mechanism is not a material part of this disclosure. Beneath the hub 24 is a plenum chamber 32 having an upwardly extending collar 34 coaxial with and surrounding the sleeve portion 26, said collar and sleeve portion being separated by a suitable labyrinth seal 36 to allow free rotation without gas leakage. The base of the plenum chamber 32 is fixed to the lower beam 22 and contains a lower bearing 38 in which is journalled a shaft 40, fixed to the sleeve portion 26 by a spider 42, or the like. Extending upwardly from the top of the hub 24 coaxial with shaft 40 is a boss 44, which is journalled in an upper bearing 46 mounted in the upper beam 20, so that the fan 10 is freely rotatable in the bearings.

The plenum chamber 32 is connected by a conduit 48 to the tailpipe 50 of jet engine 16, the entrance to said conduit being fitted with a slide valve 52, or the like, within said tailpipe. The shape of the conduit 48 is designed to conduct gases from the jet engine 16 to the plenum chamber 32 in a smoothly flowing path and is also shaped to offer a minimum of drag to the airstream downwardly through the duct 12. While the jet engine 16 is illustrated as the source of propulsion gases for the fan, it should be understood that other types of gas generators may be used in certain installations.

The fan 10 is illustrated as having four blades, but any suitable number may be used. Each fan blade 30 is of conventional aerodynamic shape and is hollow to conduct gases through its length. At the tip of each blade 30 is a jet unit 54, comprising an enlarged chamber 56 integral with said blade and having a nozzle 58 extending from the trailing edge thereof, generally tangential to the direction of rotation of the fan. The interior of the chamber 56 is shaped to turn the gases rearwardly through the nozzle 58 for a propulsive thrust. At the forward end or leading edge 60 of the chamber 56 is a rearwardly directed injector 62 for injecting fuel into the gas stream to increase thrust, said injector being fed by a pipe 64 enclosed in the leading edge 66 of the blade 30. At the hub 24, the pipes 64 from the fan blades 30 are connected to the boss 44 and communicated with a distributing chamber 68 inside said boss, fuel being conveyed to the distributing chamber through a supply pipe 70 and a sealed rotary coupling 72, the fuel tank being located at any convenient position in the aircraft. Within the chamber 56 and nozzle 58 is a liner sleeve 74, shaped to conform to the internal contours of the jet unit and spaced therefrom on all sides to define a boundary layer annulus 76 between the liner and the jet unit. The liner sleeve 74 has a plurality of perforations 78 therein so that gases in the boundary layer annulus 76 can enter the sleeve and mix with the inner portion of the gas stream therein. The liner sleeve 74 is supported inside the chamber 56 and nozzle 58 by suitable spacers 80.

Fitted around the jet unit 54 is an outer shroud 82 substantially larger than said jet unit and extending to the front and rear thereof, said shroud having a frontal inlet scoop 84 and a rear outlet nozzle 86. The shroud 82 is fixed to the fan blade 30 on one side and supported on the jet unit 54 by a small strut 88 on the otherside and is shaped to carry a layer of cool air around the jet unit to mix with the exhaust from the nozzle 58.

The duct is enclosed by a plurality of upper vanes 90 and lower vanes 92, said upper vanes being coextensive with the upper surface of the wing 14 and the lower vanes being coextensive with the lower surface of the wing. The upper vanes 90 are hinged at their trailing edges on parallel axes extending spanwise of the wing 14, while the lower vanes 92 are similarly hinged at their leading edges, as in Figures 2 and 6. When closed, the vanes 90 and 92 preserve the contours of the wing for normal forward flight, but when opened, the duct 12 is exposed so that the fan 10 can generate vertical lift. The arrangement and operation of the vanes 90 and 92 and the method of controlling the aircraft in vertical flight and transition to horizontal flight are fully described in the copending application by John M. Peterson for a jet powered, ducted fan convertiplane, Serial No. 713,232, filed February 4, 1958. The present disclosure is concerned primarily with a specific fan and its method of propulsion rather than the complete aircraft as such.

Figure 2:
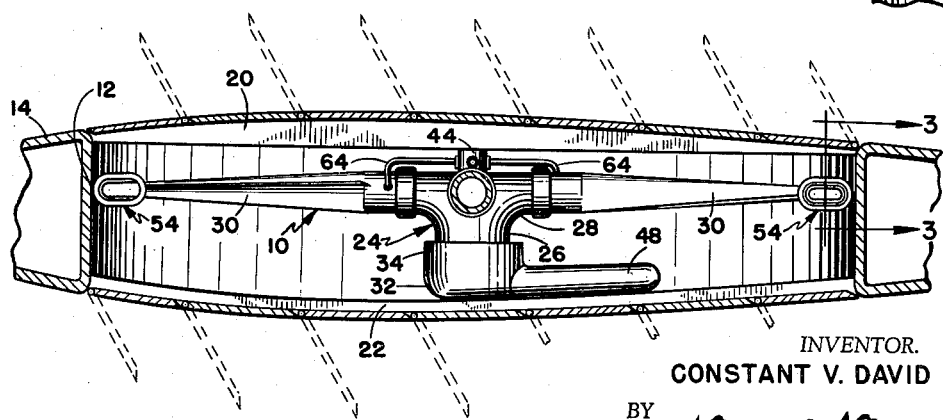
Figure 2 is an enlarged fragmentary sectional view taken on the line 2—2 of Figure 1.
Figure 4:
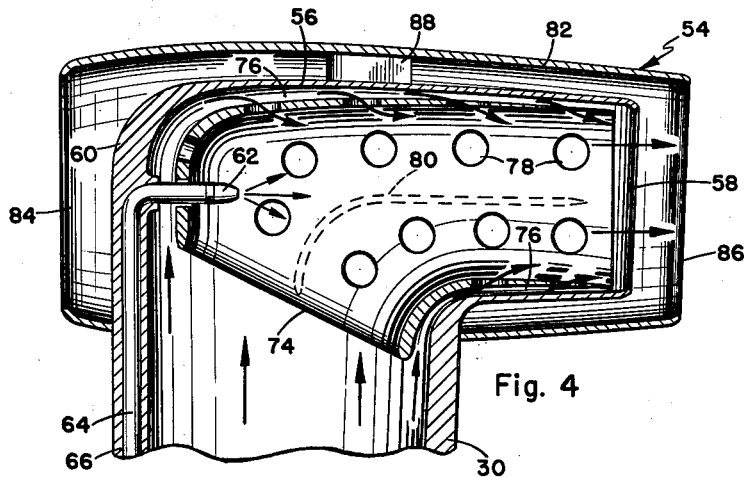
Figure 4 is a sectional view taken on the line 4—4 of Figure 3.
Figure 3:
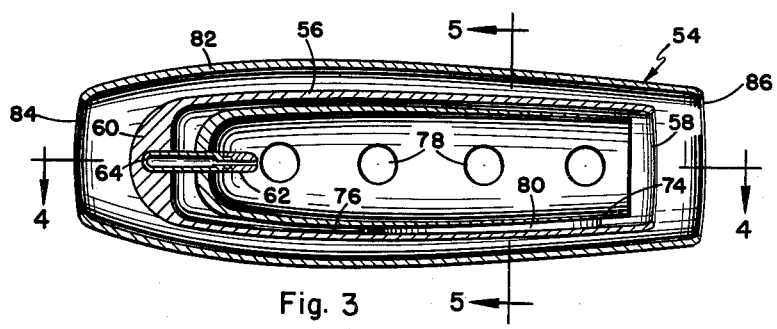
Figure 3 is an enlarged fragmentary sectional view of the tip-jet unit taken on the line 3—3 of Figure 2.
Figure 5:
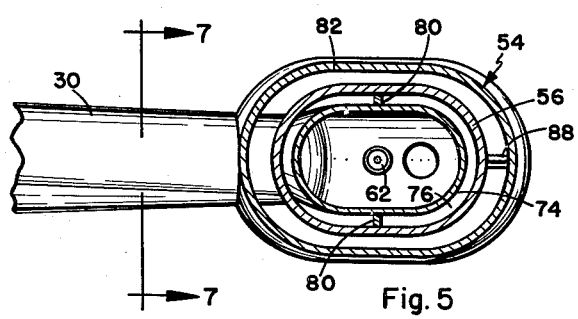
Figure 5 is a sectional view taken on the line 5—5 of Figure 4.
Figure 6:
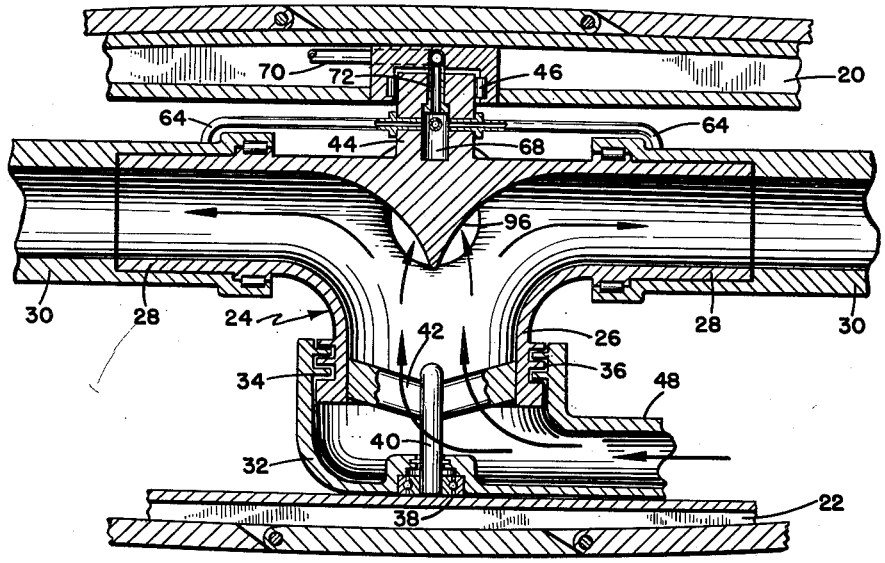
Figure 6 is an enlarged fragmentary sectional view taken on the line 6—6 of Figure 1.
Figure 7:
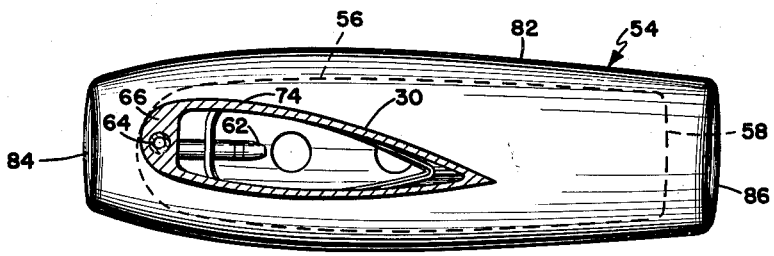
Figure 7 is a sectional view taken on the line 7—7 of Figure 5.

For vertical flight, the vanes 90 and 92 are opened, as indicated in dash line in Figure 2, to expose the duct 12, and the valve 52 is opened to allow the exhaust gases from jet engine 16 to enter the conduit 48. Some type of movable baffle, such as indicated at 94 in Figure 1, may be necessary to obtain full diversion of the exhaust gases to the fan 10, a suitable arrangement being described in the above mentioned copending application. The exhaust gases enter the plenum chamber 32 and are directed upwardly and outwardly through the stub arms 28, the hub 24 having an internal flared deflector cone 96 to ensure smooth separation of the gases. The exhaust gases flow radially outwardly through the blades 30 and are ejected tangentially from the nozzles 58, the resultant thrust reaction causing the fan to rotate and create a downward flow of air through the duct 12 to lift the aircraft. For additional lift, such as under heavy load conditions fuel is sprayed into the chambers 56 from injectors 62. No ignition means is indicated since it is intended to use a pyrophoric fuel, such as aluminum triethyl or aluminum trimethyl, which ignites spontaneously when exposed to air. The fuel is stored in a suitable tank 98 and the flow is controlled by a pilot actuated valve 99, as indicated in dash line in Figure 1. The additional thrust is thus produced by a type of afterburning in the jet units, the structure being protected from the additional heat by the liner sleeve 74, which is of suitable heat-resistant material. The outer portions of the gas stream flow through the annulus 76 between the chamber 56 and liner sleeve 74 in each jet unit and provide a boundary layer considerably cooler than the hot core of gases produced by the burning fuel, the boundary layer gases re-entering the main gas stream through the perforations 78. At the nozzle 58, the exhaust gases mix with the cool air from the shroud 82, so that the resultant jet exhaust is somewhat cooled to prevent burning of the duct structure. Vertical thrust can be controlled by throttling the jet engine 16 and by changing the pitch of the fan blades 30, if the necessary mechanism is installed.

Figure 8:
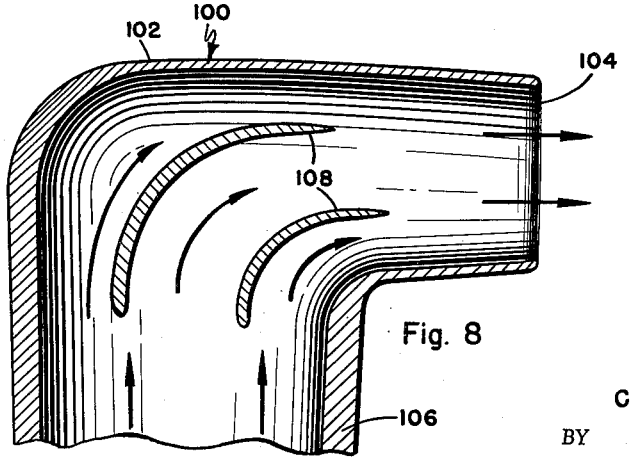
Figure 8 is a sectional view similar to Figure 4, showing a modified form of the tip-jet unit.

If the additional thrust offered by afterburning is not required, the structure may be simplified as in the jet unit 100 illustrated in Figure 8, in which a simple chamber 102 and nozzle 104 are incorporated in the tip of the fan blade 106. In this particular jet unit 100, the sole function is to turn the exhaust gases rearwardly through the nozzle 104 and suitable flow directing vanes 108 may be fitted inside the chamber 102 to ensure a smooth flow.

The tip driven fan eliminates the need for shaft mechanisms and complex gearing, so reducing weight which is a critical factor in vertical take-off aircraft. By using a pyrophoric fuel no ignition gear is necessary, with a consequent reduction in weight at the fan blade tips.

The operation of this invention will be clearly comprehended from a consideration of the foregoing description of the mechanical details thereof, taken in connection with the drawings and the above recited objects. It will be obvious that all said objects are amply achieved by this invention.

It is understood that minor variation from the form of the invention disclosed herein may be made without departure from the spirit and scope of the invention, and that the specification and drawings are to be considered as merely illustrative rather than limiting.

I claim:

In an aircraft: a circular duct extending substantially vertically through the aircraft structure; a fan mounted in said duct for free rotation about the vertical axis of the duct; said fan having a central hub; a plurality of hollow, gas conducting fan blades mounted on said hub; a plenum chamber in said hub communicating with the interior of said blades; each of said blades having a jet unit mounted on the tip thereof; each of said jet units having a chamber and a gas ejecting nozzle extending therefrom substantially tangent to said fan; gas flow guiding means in each chamber to direct gases outwardly through the nozzle; a fuel injector mounted in each chamber and positioned to inject fuel in the direction of the nozzle; a perforated liner sleeve fixed inside each chamber and nozzle and closely spaced therefrom to define a narrow boundary layer annulus therebetween; a fixed shroud surrounding each chamber and nozzle and spaced therefrom; each shroud having an inlet, and an outlet substantially concentric with the nozzle; and a source of compressed gases connected to said plenum chamber.

References Cited in the file of this patent

UNITED STATES PATENTS

| | | |
|---|---|---|
| 2,605,608 | Barclay | Aug. 5, 1952 |
| 2,688,371 | Pesaro | Sept. 7, 1954 |
| 2,710,067 | Pesaro | June 7, 1955 |
| 2,718,364 | Crabtree | Sept. 20, 1955 |

FOREIGN PATENTS

| | | |
|---|---|---|
| 1,068,404 | France | Feb. 3, 1954 |